Patented June 4, 1946

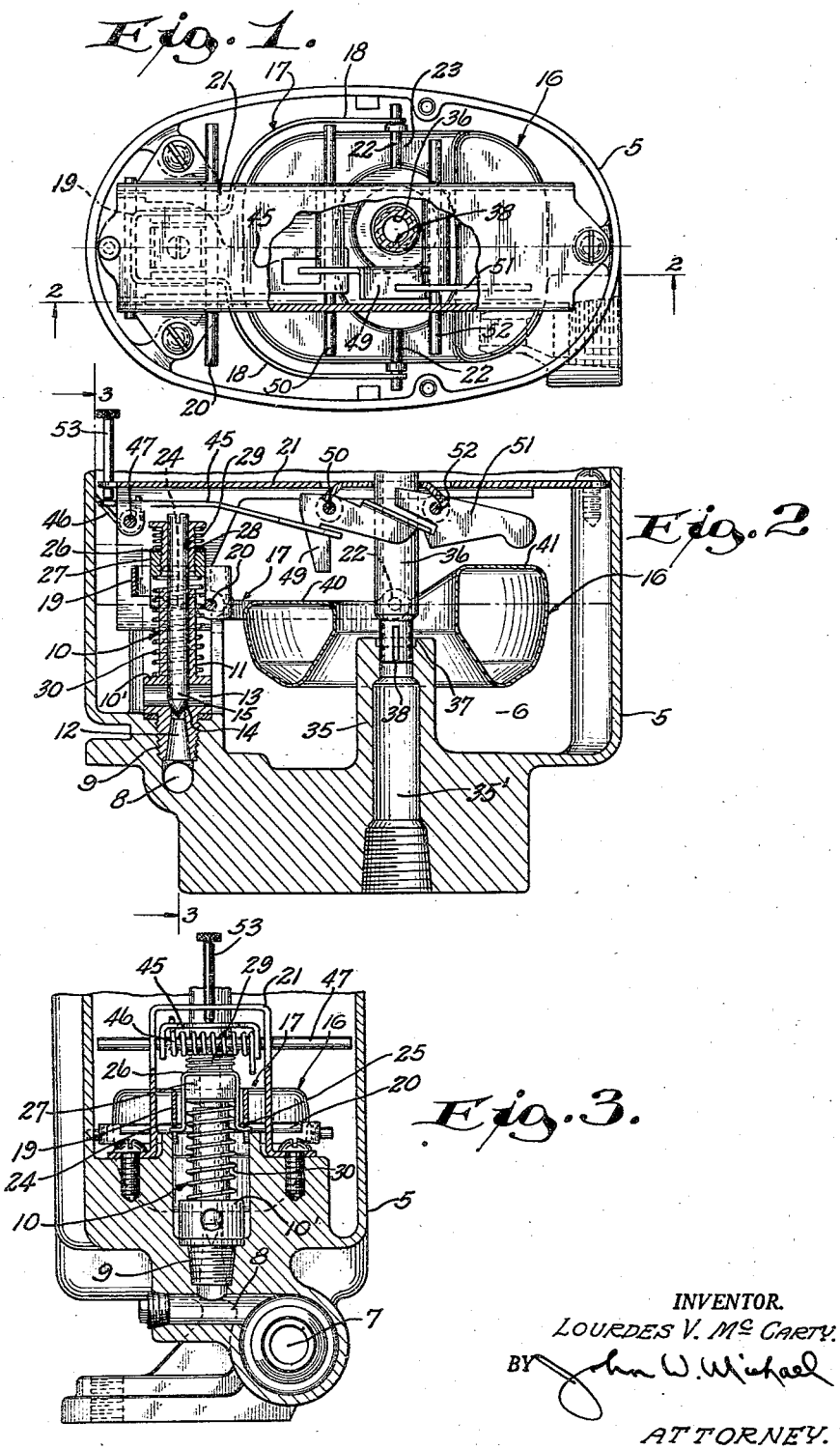

2,401,312

UNITED STATES PATENT OFFICE 2,401,312

SHUTOFF FOR CONSTANT LEVEL CONTROL DEVICES

Lourdes V. McCarty, Milwaukee, Wis., assignor to Automatic Products Company, Milwaukee, Wis., a corporation of Wisconsin Application November 5, 1943, Serial No. 509,098

6 Claims. (Cl. 137—68)

This invention relates generally to a constant level device of the type employed between the tank or reservoir for the fuel and a burner of a gravity feed type.

Constant fuel level control devices usually comprise a casing having a liquid supply chamber provided with a fuel inlet connected to the fuel reservoir. A float-controlled valve regulates the flow of the liquid fuel through the inlet to maintain a constant level in the liquid supply chamber. Some suitable form of safety shut-off mechanism must also be combined with the inlet valve, for the purpose of preventing flooding of the burner in case of failure of the main float, to control the inlet valve so as to maintain a predetermined level of the liquid fuel in the supply chamber. The safety cut-off mechanism of the present invention comprises a pivoted arm or lever weighted or spring-biased to strike forcibly against the inlet valve and push it into closed position. Under normal conditions the weighted arm or lever is latched in inactive position and in spaced overlying relation to the inlet valve.

To provide for automatic release of the latch and action on the part of the safety cut-off mechanism, an arrangement was heretofore made including an overflow pipe and a bucket so that the excessive liquid in the liquid supply chamber flowing through the overflow pipe accumulated in the bucket with the result that the weight of the excess liquid would, through suitable motion transmission means, trip the safety cut-off mechanism. It was also proposed to incorporate in the casing an overflow chamber separated from the liquid supply chamber by a dam of suitable height. An overflow float was provided in the overflow chamber and operatively interconnected with the release mechanism for the latch of the safety cut-off mechanism. While the latter structure represented an advance over the bucket arrangement, it required the provision, in the casing, of two floats and the overflow chamber in addition to the liquid fuel supply chamber.

The present invention proposes to provide a constant fuel level control device equipped with a safety cut-off mechanism so constructed and organized that a single float serves the dual purpose of normally maintaining a predetermined level of liquid in the liquid supply chamber, and yet is capable of and effective to trip the safety cut-off mechanism when the level of the liquid in the supply chamber rises above the predetermined level and flooding conditions are imminent.

A further object of the invention is to provide a constant fuel level control device which is extremely compact and closely organized in its construction, reliable and safe in operation, and easy and comparatively inexpensive to manufacture and maintain.

The present invention proposes to employ a float in the form of an annulus or so-called "doughnut" type of float; to symmetrically dispose the float with respect to its float lever; to pivotally or rockably interconnect the float with its lever; and to constitute the float of two half sections of different size or volume, the section of the float adjacent the valve being smaller and that remote from the valve being larger. Under normal operating conditions, equal volumes of both sections of the float are submerged so that the float is buoyed up uniformly in the liquid fuel and rises and falls uniformly through its entire area upon change in liquid level. If, however, upon the rise of the liquid fuel level in the supply chamber to the predetermined height, the inlet valve fails to close for any reason such as the presence of grit between the active surface of the valve and its seat, the float lever and the pivotal or rocking connection between the float lever and the float becomes fixed. As the liquid level continues to rise, the degree of submergence of the larger half of the float increases. In accordance with the well-known laws of physics, the increase in the volume submerged on the larger side of the float results in corresponding loss of weight with the result that the float turns or rocks about its pivotal connection with the float lever. The large side of the float moves upwardly and eventually strikes and trips the latch of the safety cut-off mechanism. The safety cut-off mechanism then forces the inlet valve into closed position.

Other objects and advantages will be apparent from the construction, arrangement, and combination of parts, hereinafter more fully described and particularly pointed out in the appended claims, reference being had to the accompanying drawing forming a part of this specification, and in which:

Figure 1 is a top plan view showing the constant level device embodying the present invention, the cover plate of the device being removed and a portion of the supporting bracket for the operating instrumentalities of the device being broken away for the sake of illustration;

Figure 2 is a view in longitudinal, vertical cross section, taken on the plane of line 2—2 of Figure 1, with some parts shown in elevation for the sake of illustration; and Figure 3 is a fragmentary view in transverse, vertical cross section, taken on the plane of line 3—3 of Figure 2.

Referring to the drawing, it will be seen that a constant level device embodying the present invention comprises a casing 5 provided interiorly with a liquid supply chamber 6. A liquid supply conduit or inlet 7 is provided on the underside of the casing and is connected with a tank or reservoir for liquid fuel (not shown). At one point this fuel supply conduit 7 communicates with a transverse passage 8, which in turn communicates with an internally threaded opening 9 formed in the bottom of the liquid supply chamber and extending from the passage 8 to the liquid supply chamber 6. The communication which this opening 9 affords between the passage 8 and the liquid supply chamber 6 is regulated by an inlet valve, designated generally at 10. The inlet valve 10 comprises a casing 11 having its lower end threaded in the opening 9 and provided with an axial opening 12 and transverse openings 13 intersecting the axial opening 12 and communicating with the liquid supply chamber 6. A valve seat 14 is formed by the intersection of the openings 12 and 13 and the beveled lower end of the valve body or needle valve 15 coacts with the valve seat 14 to regulate the flow of liquid fuel from the conduit 7 into the liquid supply chamber 6. As shown in the drawing, the inlet valve 15 is slidably interfitted with the upper portion of the axial opening 12 which is adapted to guide movement of the valve by a float, designated generally at 16. The float 16 is buoyed up by the liquid in the liquid supply chamber 6 and is engageable or operatively interconnected with the valve 15 through a float lever 17, in a manner now to be described.

The float 16 is in the form of an annulus or of the "doughnut" type shown in the drawing. The float lever 17 is of a yoke-like construction, shown to advantage in Fig. 1 of the drawing. Its curved side arms 18, each of which parallels one side of one-half of the float, are connected at one end by a U-shaped connecting member or bridge 19. Near the juncture of the U-shaped connecting member 19 and the arms 18, the side members of the U-shaped connecting member 19 have transversely alined openings to receive the intermediate portions of a pivot or fulcrum pin 20, the ends of which are supported in suitable openings provided therefor on the side members of a supporting bracket 21. The pin 20 provides a fixed fulcrum about which the float lever 17 rocks or pivots. The ends of the arm 18, opposite the U-shaped connecting member 19, are provided with transversely alined trunnions 22, the trunnions being fixed to their respective arms and projecting inwardly over the central portion of the float 16. The float 16 has its upper wall formed centrally with V-shaped depressions 23 in the bottoms of which the trunnions 22 engage. This is one advantageous way in which the float 16 and its lever 17 may be symmetrically interrelated and also rockably or pivotally interconnected.

While the float lever 17 may be operatively interconnected with the inlet or needle valve 15 in various ways, one advantageous way of accomplishing this is illustrated in the drawing. As there shown, the side portions of the U-shaped connecting member 19 of the float lever 17 are formed with integral, downwardly extending, rounded bosses or lugs 24, which bear on outwardly directed arms 25 provided on inverted U-shaped abutment 26 mounted on the inlet valve 15. The abutment 26 may be a sheet metal stamping, and its body portion has an opening which fits over the upper end of the needle or inlet valve 15 and rests on a nut 27 threaded on to a sleeve 28 press-fitted or otherwise suitably secured to the upper end of the stem or needle inlet valve 15. A helical spring 29 under compression is employed between the top of the nut 27 and the flanged upper end of the sleeve 28 to releasably maintain the nut in adjustment.

The inlet valve is biased to open position preferably by means of a helical spring 30 under compression which surrounds the casing 11 of the inlet valve, abuts the shoulder 10' at its lower end, and abuts the under side of the nut 27 at its upper end.

A tubular extension 35 rises from the bottom of casing 5 and provides an outlet passage 35' leading from the liquid supply chamber 6 and connected by a suitable pipe (not shown) with the burner (also not shown). A metering valve 36 is cooperatively interrelated with a valve seat 37 formed at the upper end of the tubular structure 35 about the outlet passage 35'. The metering valve has a metering slot 38 and is offset from the center line of the float so that its metering slot 38 will be at the center line of the float.

The float 16, which is in the form of a hollow annular shell, is composed of two sections 40 and 41. These sections are constituted of continuous metal walls, but the section 40 is smaller than the section 41. In so far as the dimensions of the section 40 correspond to the lower portion of the section 41, the contours, shape, and volumetric content are the same; the section 41 simply is extended upwardly for a greater distance than the section 40 thereby increasing the total volumetric content of section 41.

The safety cut-off mechanism essentially comprises a normally inactive lever 45 weighted and biased by a spring 46 to swing the lever downwardly about a pivot 47 mounted in the bracket 21 and to strike against the top of the needle valve 15 to force the valve into closed position. Under normal conditions, the lever 45 is latched against action of the spring, by means of a bell crank or latch 49 pivoted at 50 in bracket 21. A catch or trip member 51 is pivotally mounted at 52 on bracket 21 and is cooperatively interrelated with the latch. The trip member normally holds the latch engaged with the safety cut-off lever 45, but if the trip member is disengaged from the latch 49, then the latch, under the influence of its own weight or bias, disengages the lever 45 and permits the lever to force the needle valve 15 closed.

The safety cut-off mechanism is provided with some suitable form of reset mechanism illustrated diagrammatically at 53.

With the construction described, as long as conditions are normal, the float 16 rises and falls to close and allow opening of the needle valve 15 and to maintain the desired level of the liquid fuel in the supply chamber 6. If the inlet valve 15 sticks, or for some reason fails to close, then the valve 15 and the float lever 17, 18, with its trunnions 22, become a fixed element in the structure and the liquid level rises. Upon a continued rise of the liquid level, instead of equal volumes of both sections of the float being submerged, more and more of the float section 41 is submerged in the liquid. The float 16 then rocks about the trunnions 22 in a counter-clockwise direction (referring to the structure shown in Figure 2). The top of the large section 41 eventually strikes the trip 51, thereby disengaging it from the latch 49, permitting the latch to swing under the influence of its own weight out of engagement with the safety cut-off lever 45, whereupon the spring 46 snaps the lever 45 downwardly and forces the inlet valve 15 into closed position.

Although but one embodiment of the invention has been illustrated and described, it is to be understood that various changes and modifications may be made therein without departing from the spirit of the invention or the scope of the subjoined claims.

I claim:

1. A constant level control device comprising a casing having a liquid supply chamber with an inlet, a valve for regulating the flow through the inlet, a float buoyed up in the liquid in the supply chamber, a float lever pivoted intermediate its ends and having one end engaging the valve and having its other end rockably connected with the float, the volume of the float being dissymmetrically disposed with relation to the end of the lever connected therewith, the center of buoyance of the float being in the vertical plane of the lever-float connection until interruption of closing movement of the valve before seating and shifting beyond the connection thereafter, and a safety cut-off mechanism adapted to be tripped by the float to close the valve when the float rocks due to the shifted center of buoyance upon rise in the level of the liquid in the supply chamber above the smaller volume portions of the float.

2. A constant level control device comprising a casing having a liquid supply chamber with an inlet, a valve for regulating the flow through the inlet, a float buoyed up in the liquid in the supply chamber, a float lever pivoted intermediate its ends and having one end engaging the valve and having its other end rockably connected with the float, the center of buoyance of the float being in the vertical plane of the lever connection with the float until interruption of closing movement of the valve prior to reaching its seated position, the float being larger on one side of its connection with the lever than on the other side thereof and shifting the center of buoyance beyond the connection upon interruption of closing movement of the valve, and a safety cut-off mechanism adapted to be tripped by the float to close the valve when the float rocks upon rise in the level of the liquid in the supply chamber above a predetermined level.

3. A constant level control device comprising a casing having a liquid supply chamber with an inlet, a valve for regulating flow through the inlet, a float buoyed up in the liquid in the supply chamber, a float lever fulcrumed intermediate its ends and having one end engaging the valve and having its other end rockably connected with the float, the float being on a central horizontal axis with the lever and having its center of buoyance in the vertical plane of the float-lever connection so long as movement of the valve towards closed position continues, the float being larger on one side of its connection with the lever than on the other side thereof and shifting the center of buoyance towards the larger float side upon rise of the liquid above a predetermined level, and a safety cut-off mechanism overlying the float and adapted to be tripped by the larger side of the float to close the valve when the float rocks upon the occurrence of flooding conditions in the liquid supply chamber.

4. A constant level device comprising a casing having a liquid supply chamber provided with an inlet, a valve for regulating flow through the inlet, a float buoyed up in the liquid in the supply chamber, a float lever fulcrumed intermediate its ends and having one end engaging the valve and having its other end rockably connected with the float, the center of buoyance of the float being in the vertical plane of the lever connection therewith until interruption of closing of the valve before seating and shifting beyond the connection thereafter, the top of the float being higher above a predetermined liquid level on one side of its connection with the lever than on the other side thereof, and a safety cut-off mechanism overlying the float and tripped by the high side of the float to close the valve when the float rocks due to shifting of the center of buoyance on the occurrence of flooding conditions in the liquid supply chamber.

5. A device for maintaining a constant pressure in a liquid supply and comprising a casing having a liquid supply chamber with an inlet, a valve regulating flow through the inlet, a float buoyed up in the liquid in the supply chamber and acting to close the valve upon rise in the liquid lever, a lever having its one end engaging the valve and having its other end engaging the float on an axis in a horizontal plane and transversely to the longitudinal axis of the float and substantially centrally thereof, the float being so shaped that its center of buoyancy is normally in the vertical plane of the float-lever connection and being shifted from the plane of the connection upon increase in liquid level due to interruption of closing movement of the valve by the float and before seating of the valve, and a safety cut-off mechanism tripped by the float upon rocking of the float due to the shifted center of buoyance as the level of liquid in the supply chamber rises above a predetermined value.

6. A constant level control device comprising a casing having a liquid supply chamber with an inlet and a valve for regulating flow through the inlet, a float buoyed up in the liquid in the supply chamber, a float lever fulcrumed intermediate its ends and having one end engaging the valve and having its other end rockably connected with the float, the submerged portion of the float being symmetrically disposed with respect to its rockable interconnection with the lever to maintain the center of buoyance of the float in the vertical plane of the float-lever connection so long as the liquid remains below a predetermined level and to shift beyond the connection thereafter, the vertical dimensions of the float being greater on one side than the other and shifting the center of buoyance toward the larger side upon rise of the liquid above the predetermined level, and a safety cut-off mechanism functioning to move the inlet valve in closed direction and including a latch normally acting to maintain the safety cut-off mechanism inactive and effective when released to allow the safety cut-off mechanism to function, the side of the float having greater vertical dimensions engaging and releasing the latch when the center of buoyance shifts as the level of the liquid in the supply chamber rises above the smaller portion of the float.

LOURDES V. McCARTY.